Jan. 17, 1961 R. J. COWART 2,968,301
BARBECUE APPARATUS HAVING ADJUSTABLE FIRE LIFT
Filed Oct. 2, 1957 3 Sheets-Sheet 1
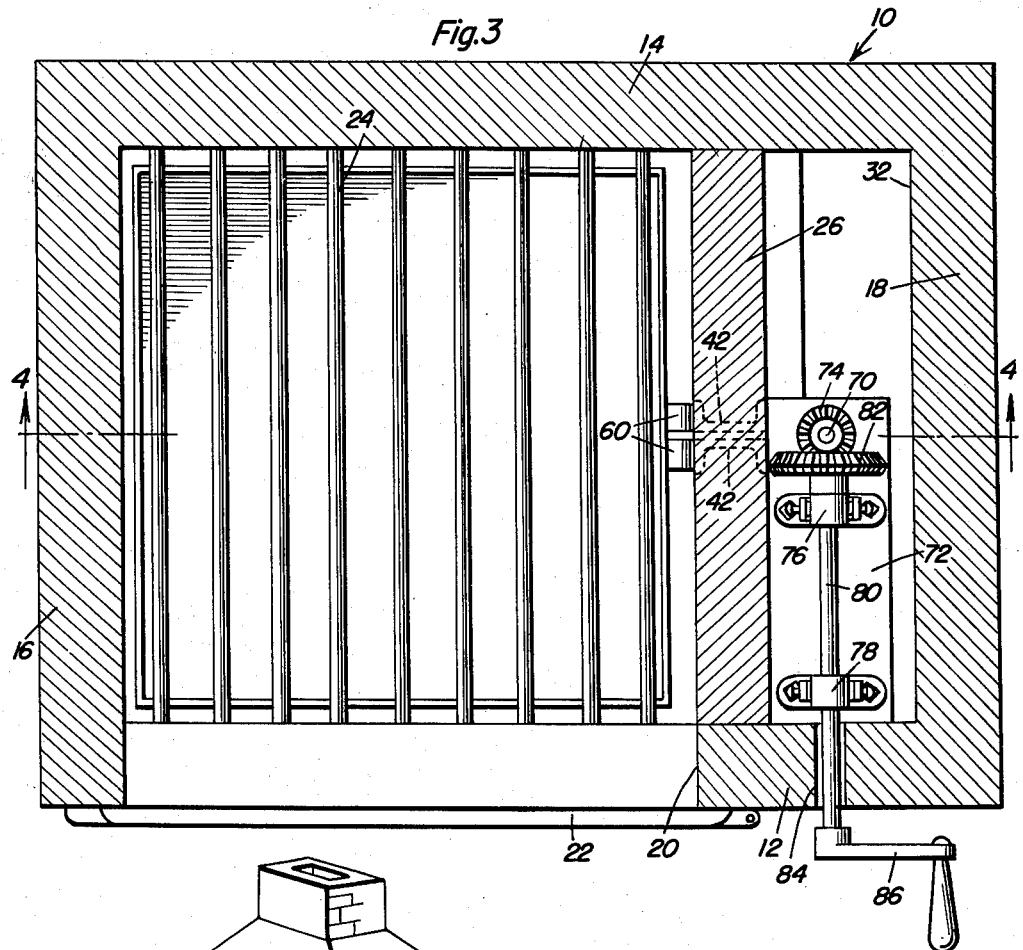
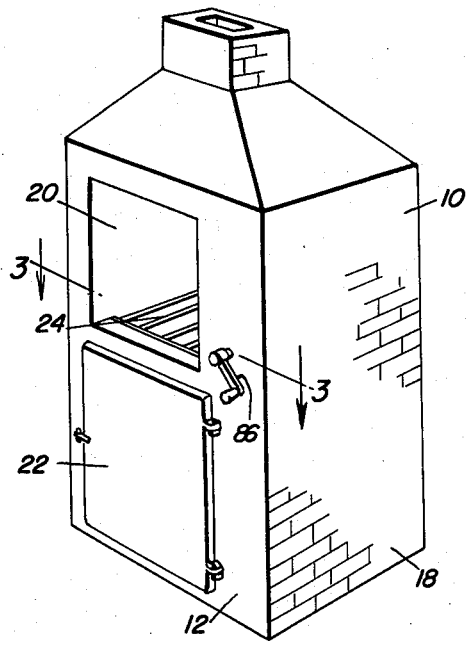
Robert J. Cowart
INVENTOR.

Jan. 17, 1961   R. J. COWART   2,968,301
BARBECUE APPARATUS HAVING ADJUSTABLE FIRE LIFT
Filed Oct. 2, 1957   3 Sheets-Sheet 2
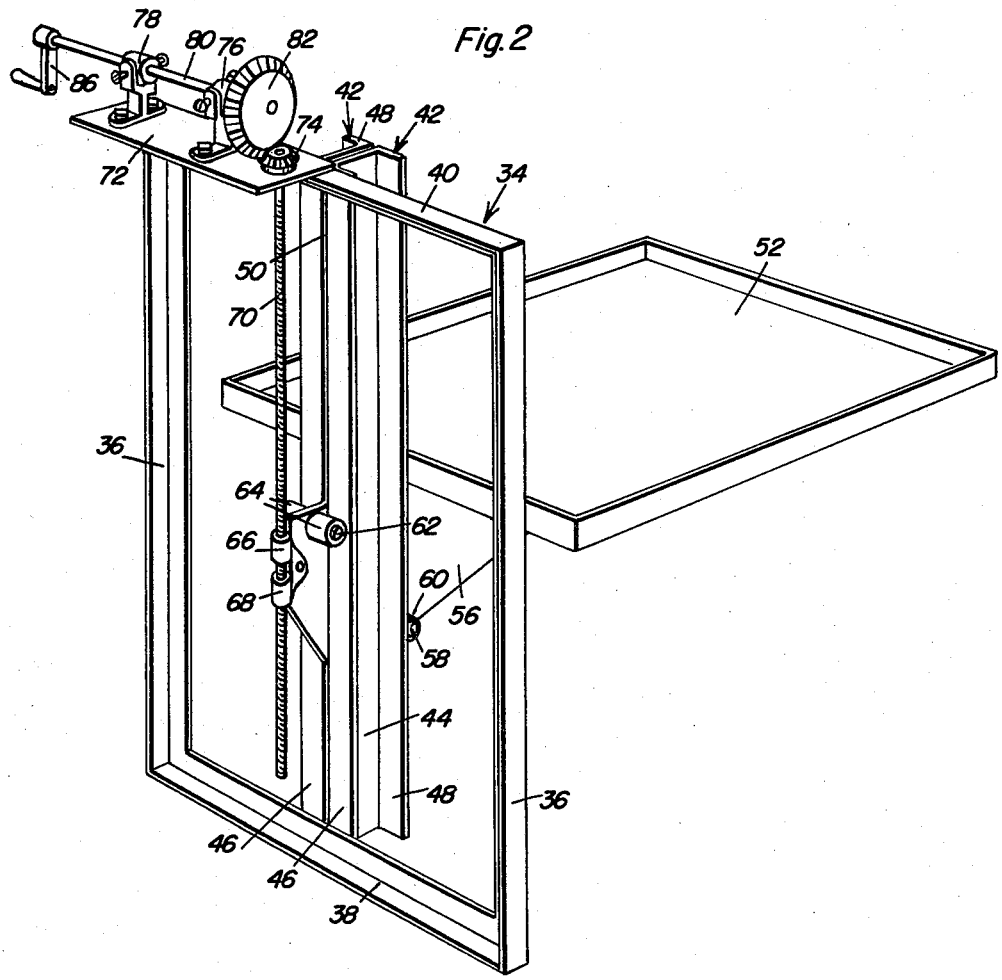
Fig. 2
Fig. 5
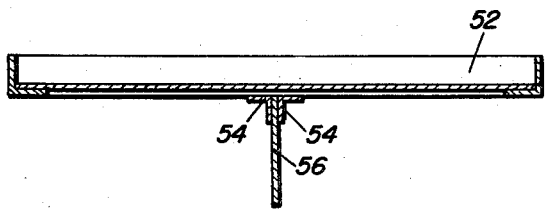
Robert J. Cowart
INVENTOR.

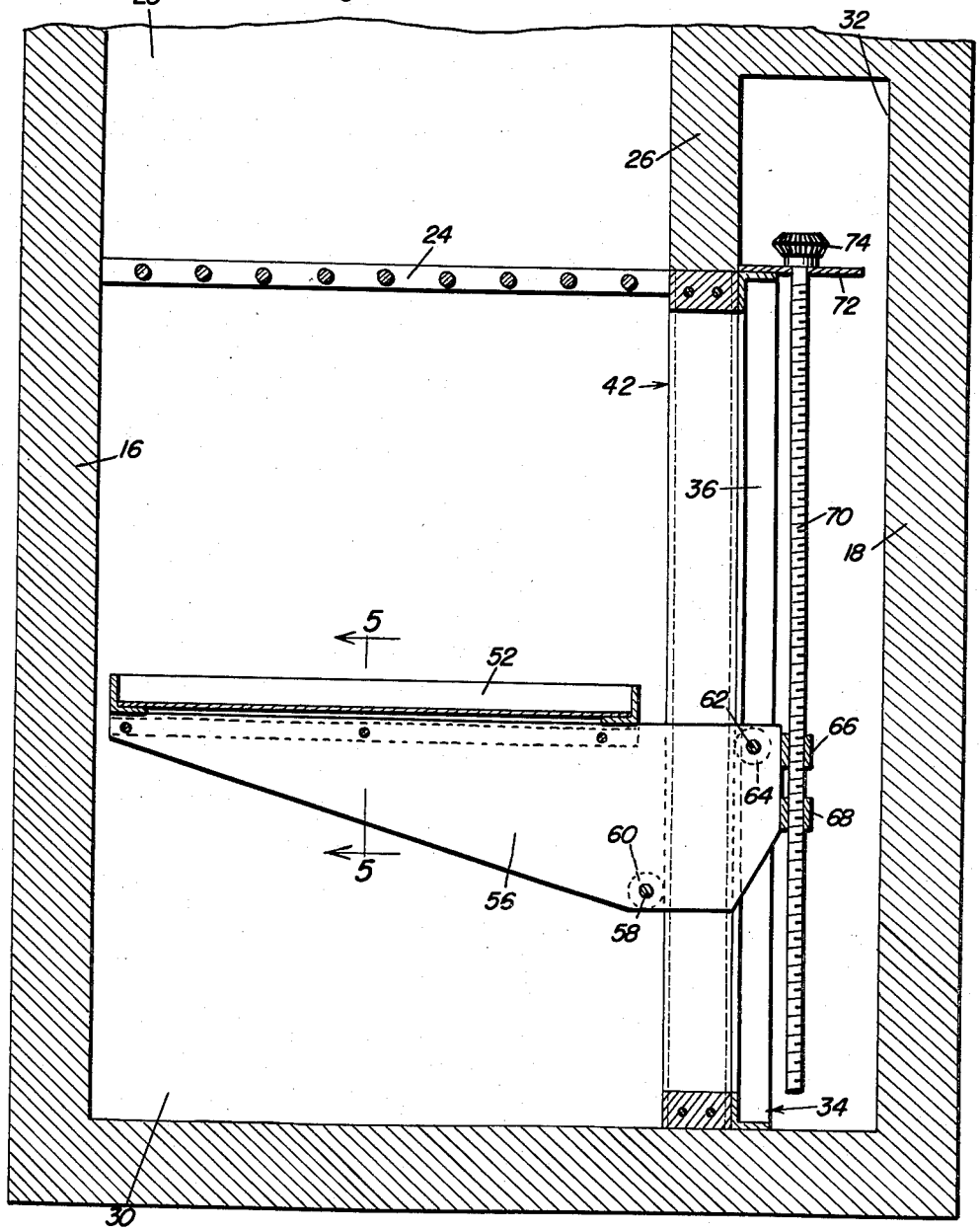

United States Patent Office 2,968,301
Patented Jan. 17, 1961

2,968,301

BARBECUE APPARATUS HAVING ADJUSTABLE FIRE LIFT

Robert J. Cowart, 1968 W. Concho, San Angelo, Tex.

Filed Oct. 2, 1957, Ser. No. 687,742

3 Claims. (Cl. 126—25)

This invention comprises a novel and useful barbecue apparatus having an adjustable fire lift and particularly relates to a barbecue apparatus having a vertically adjustable fire pin for more effectively barbecuing meats and the like.

The principal object of this invention is to provide a barbecue apparatus having a vertically adjustable fire pan with improved mechanism for raising and lowering the same.

A further object of the invention is to provide an apparatus in accordance with the preceding object wherein the mechanism for raising and lowering the fire pan shall be housed in a separate compartment thereby preventing damage to the same from the weather, intense heat or the like.

A further object of the invention is to provide a barbecue apparatus which will permit a more uniform distribution of heat from the coals of the fire pan to all areas of the grill whereby the broiling of steaks and the like can be more effectively controlled.

Yet another object of this invention is to provide a barbecue apparatus as set forth in the foregoing objects wherein there is afforded a rapid means for lowering the fire pan beneath the grill whereby any flames arising from fat drippings will not damage the meat being cooked.

Yet another object of the invention is to provide an adjustable fire pan for a barbecue apparatus which may be effectively retained in any chosen elevation without the necessity for a separate locking device for the same.

And a final important object of the invention to be specifically enumerated herein resides in the provision of a barbecue apparatus as set forth in the above mentioned objects which shall be constructed as a complete barbecue unit adaptable for use in an all metal cabinet as well as in a fireplace built of any suitable type of masonry, whereby the latter may be constructed for use either outdoors or inside a dwelling as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing one suitable embodiment incorporating therein the principles of this invention;

Figure 2 is a perspective view of the vertically adjustable fire pan forming the essential feature of this invention;

Figure 3 is a horizontal sectional view taken on an enlarged scale substantially on the plane indicated by section line 3—3 of Figure 1 and looking down upon the grill and the mechanism for operating the adjustable fire pan thereof;

Figure 4 is a vertical transverse sectional view taken substantially upon the plane indicated by the section line 4—4 of Figure 3, and upon an enlarged scale, and showing the manner in which the adjustable fire pan is mounted in a suitable barbecue oven, and with the elevating mechanism of the fire pan being housed in a separate compartment thereof; and Figure 5 is a vertical transverse sectional detail view taken substantially upon the plane indicated by the section line 5—5 of Figure 4.

Illustrated in Figures 1, 3 and 4 is a suitable embodiment of the present invention, that illustrated being particularly adapted for use outdoors in the form of a barbecue cabinet. It will be understood however that the invention claimed herein may not only be incorporated in an outdoor barbecue cabinet, but may be built in other stationary cabinets as in a dwelling or the like, or even may be mounted in a wheeled or portable barbecue stand as desired.

It is an essential feature of this invention however that the fire pan and its mechanism for raising the same towards and from the grill shall be mounted in a cabinet wherein the operating mechanism for raising and lowering the fire pan may be separately housed from the chamber receiving the vertically adjustable fire pan.

Accordingly, it will be understood that the cabinet housing the vertically adjustable fire pan and its adjusting mechanism illustrated in the drawings is to be considered as an exemplification only of the principles of the invention. In the arrangement illustrated there is disclosed a barbecue cabinet 10 having suitable front and back walls 12 and 14 together with side walls 16 and 18. The front wall 12 is provided with an opening 20 into an oven chamber 28 in the cabinet and a door 22 opening into a fire pit chamber 30, any suitable form of grill 24 being disposed in the interior of the cabinet between the oven and the fire pit chambers.

There is also provided a vertically extending partition 26 lying between the front and back walls 12 and 14 and extending from the bottom to the top of the inside of the cabinet 10, which thus divides the interior of the same into the aforementioned oven and fire pit chambers, see Figure 4 and a relatively smaller operating mechanism compartment 32 which houses the operating mechanism for elevating the fire pan.

Referring now primarily to Figure 2 it will be seen that the adjustable fire pan and its elevating mechanism, forming the subject matter of the invention claimed herein, comprises a unitary assembly which is adapted to be installed as a unit in any suitable type of cabinet such as that indicated at 10 and described hereinbefore. The unit comprises a substantially rectangular vertically disposed supporting frame designated generally by the numeral 34 and which conveniently may consist of vertically extending angle irons 36 joined at their bottom ends by a base angle iron 38 and having an angle iron 40 extending across their top. Secured between the two side angle irons 36 and secured to the upper and lower angle iron members 40 and 38 are a pair of parallel channel members designated generally each by the numeral 42. Each of the channel iron members has a central web portion 44 disposed between a pair of parallel perpendicular flanges 46 and 48. The two webs 44 are slightly spaced from each other to provide a slot therebetween, this slot being indicated by the numeral 50.

As will now be apparent by comparing Figures 3 and 4, it will be seen that the supporting frame 34 is disposed adjacent the partition wall 26 with the channel members 42 being disposed in the mid-portion of the wall to thus provide the slot 50 through this wall for a purpose to be subsequently apparent. It will also be noted that while the channel members 42 actually lie in the partition 26, and thus except for their flanges 48 are protected from the heat of the fire pit and the oven chambers 30 and 28, the mounting frame 34 lies on that side of the partition 26 which forms a wall of the compartment 32.

Referring now to Figures 2, 4 and 5, it will be seen that there is provided a generally rectangular fire pan 52 which is received in the chamber 30 below the grill 24 for vertical movement therein, this fire pan extending over substantially all of the cross sectional area of the chamber 30, except for any suitable working clearance provided therebetween. Disposed medially of its bottom side the pan 52 has secured thereto a pair of angle irons reinforcing or stiffening members 54 which in turn embrace the upper edge of a laterally extending vertically disposed supporting plate 56. This plate serves as the support means for the fire pan and effects its vertical adjustment by a mechanism to be subsequently set forth.

The plate 56 extends entirely through the slot 50 and into the compartment 32 in the manner shown in Figure 4. Immediately adjacent the place in which the plate emerges into the chamber 30 from the slot 50, the plate is provided with a pair of laterally extending shafts, pins or trunnions 58 and a pair of rollers 60 are secured to the members 58 and ride against the flanges 48 during vertical adjustment of the fire pan. A similar pair of trunnions, pins or axles 62 extend laterally from opposite sides of the plate 56 from the upper portion thereof, and in turn are provided with rollers 64 which bear upon the flanges 46 of the channel members within the compartment 32. The two sets of rollers are so disposed that they support the weight of the fire pan 52, its contents and the plate 56 carrying the fire pan in a substantially horizontal position during vertical adjustment of the fire pan.

Projecting from and rigidly secured to the end portion of the plate 56 which extends through the slot 50 into the housing 32 are a pair of vertically spaced internally threaded bushings 66 and 68 through which extends the externally threaded adjusting or elevating shaft 70. Secured in any suitable manner to the upper frame member 40 of the supporting farme 34, and projecting laterally therefrom into the compartment 32 is a mounting plate 72, and the upper end of the shaft 70 extends therethrough and is journaled therein, being provided with a beveled gear 74. Mounted in suitable bearings 76 and 78 upon the plate 72 is a horizontally disposed shaft 80 having a beveled gear 82 engaged with the beveled gear 74 previously mentioned, this shaft extending through an opening 84 in the front wall 12 of the cabinet and having a handle 86 for operation of the same.

As so far described it will be apparent that by rotating the handle the tray may be raised or lowered to thus vary the distance of the fire pan 52 below the grate 24. If desired, the shaft 80 instead of being manually operated as by the crank 86 may be provided with any suitable power operating means such as an electric motor or the like.

From the foregoing, it is believed that the operation of this device will now be readily apparent. The fire pan 52 being disposed in the fire pit chamber 30 below the grate 24 can be readily vertically adjusted in order to position the bed of coals carried by the fire pan at a desired distance beneath the grate 24 and thus effectively control the speed and temperature of the broiling or other operation being performed by the barbecue apparatus. It will be further apparent that by positioning the elevating mechanism in a separate compartment from that of the fire pit, the operating mechanism is protected from the injurious effect of the heat of the fire pit and oven chambers; may be maintained greased and oiled for efficient operation; and also is protected against rust or other damage by inclement weather. The device provides a means for quickly lowering the fire pan if necessary, in order that any grease dripping thereon which may catch on fire need not damage the meat being barbecued thereabove.

It will also be observed that there has been provided a compact unitary assembly which may be manufactured and installed as a unit and a barbecue stand or oven, thus lending itself to a variety of types of installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A barbecue apparatus comprising a barbecue cabinet having a vertically extending partition disposed therein dividing said cabinet into two separate compartments, one of said compartments comprising an oven and fire pit chamber provided with a grill at its upper end and the other comprising an operating mechanism compartment, a supporting frame in said operating mechanism compartment, said frame including a pair of vertically disposed and slightly spaced channel members positioned in said partition providing a vertically extending slot therethrough, a fire pan disposed horizontally in said fire pit for vertical movement relative to said grill, a vertically disposed plate disposed beneath, secured to, and supporting said fire pan, said plate extending through, being slidably disposed and guided in said slot, means carried by said plate disposed on opposite sides of said partition for guidingly engaging the said channel members, and means in said mechanism compartment operatively connected to said plate for vertically moving said plate relative to said grill, through said slot, each of said channel members comprising a generally U-shaped member having a pair of parallel flanges interconnected by means of a web portion, said channel members being disposed in said partition with said webs in juxtaposed parallel spaced relation, the remote surfaces of said parallel flanges of each channel member being disposed on opposite sides of said partition, said guiding means including a pair of rollers journaled on said plate on each side of said partition with each pair of rollers engaging the flanges of said channel members on an opposite side of said partition.

2. The combination of claim 1 including a pair of laterally extending axles carried by said plate on opposite sides of said channel members, each axle journalling one of said pairs of rollers thereon.

3. The combination of claim 1 including a pair of laterally extending axles carried by said plate on opposite sides of said channel members, each axle journalling one of said pairs of rollers thereon, said axles being disposed in vertically spaced relation relative to each other.

References Cited in the file of this patent

UNITED STATES PATENTS

| 221,682 | Kintz | Nov. 18, 1879 |
| 2,365,390 | Burmeister | Dec. 19, 1944 |
| 2,507,243 | Boyd et al. | May 9, 1950 |
| 2,531,925 | Taylor et al. | Nov. 28, 1950 |
| 2,568,276 | Eggleston | Sept. 18, 1951 |
| 2,751,899 | Hamilton | June 26, 1956 |
| 2,781,037 | Vuncannon | Feb. 12, 1957 |
| 2,812,104 | Larsen | Nov. 5, 1957 |
| 2,812,415 | Markowitz | Nov. 5, 1957 |

FOREIGN PATENTS

| 416,202 | France | Aug. 1, 1910 |